United States Patent [19]

Mandich

[11] 4,422,793
[45] Dec. 27, 1983

[54] SPLIT COLLAR SPACER RING ASSEMBLY

[76] Inventor: George E. Mandich, 6202 Johnson St., Merrillville, Ind. 46410

[21] Appl. No.: 278,645

[22] Filed: Jun. 29, 1981

[51] Int. Cl.³ .................. B25G 3/00; F16B 9/00; F16L 41/00
[52] U.S. Cl. .................. 403/261; 403/344; 403/356
[58] Field of Search .............. 403/261, 336, 344, 342, 403/356

[56] References Cited

U.S. PATENT DOCUMENTS

| 2,507,093 | 5/1950 | Collings | 403/356 X |
| 3,159,047 | 12/1964 | Dable | 403/356 X |
| 3,917,424 | 11/1975 | Zugel | 403/344 X |
| 4,012,154 | 3/1977 | Durwin et al. | 403/261 |
| 4,136,989 | 1/1979 | Bianco | 403/344 X |
| 4,200,407 | 4/1980 | Bianco | 403/261 |
| 4,217,061 | 8/1980 | Eiland et al. | 403/356 X |

Primary Examiner—Wayne L. Shedd
Attorney, Agent, or Firm—Sabin C. Bronson

[57] ABSTRACT

An apparatus for holding an elongted shaft, e.g., a mill roll within a sleeve, e.g., mill chuck sleeve comprises first and second collar portions capable of being removably joined together and affixed to the shaft; a spacer adapted to be placed between the joined collar portions and the sleeve in abutting relation to the end of the sleeve; and a plurality of both first and second bolts adapted to pass through holes in the first and second collar portions, respectively, to contact the spacer, thereby maintaining the abutting relation between the spacer and at least a portion of the sleeve.

7 Claims, 5 Drawing Figures

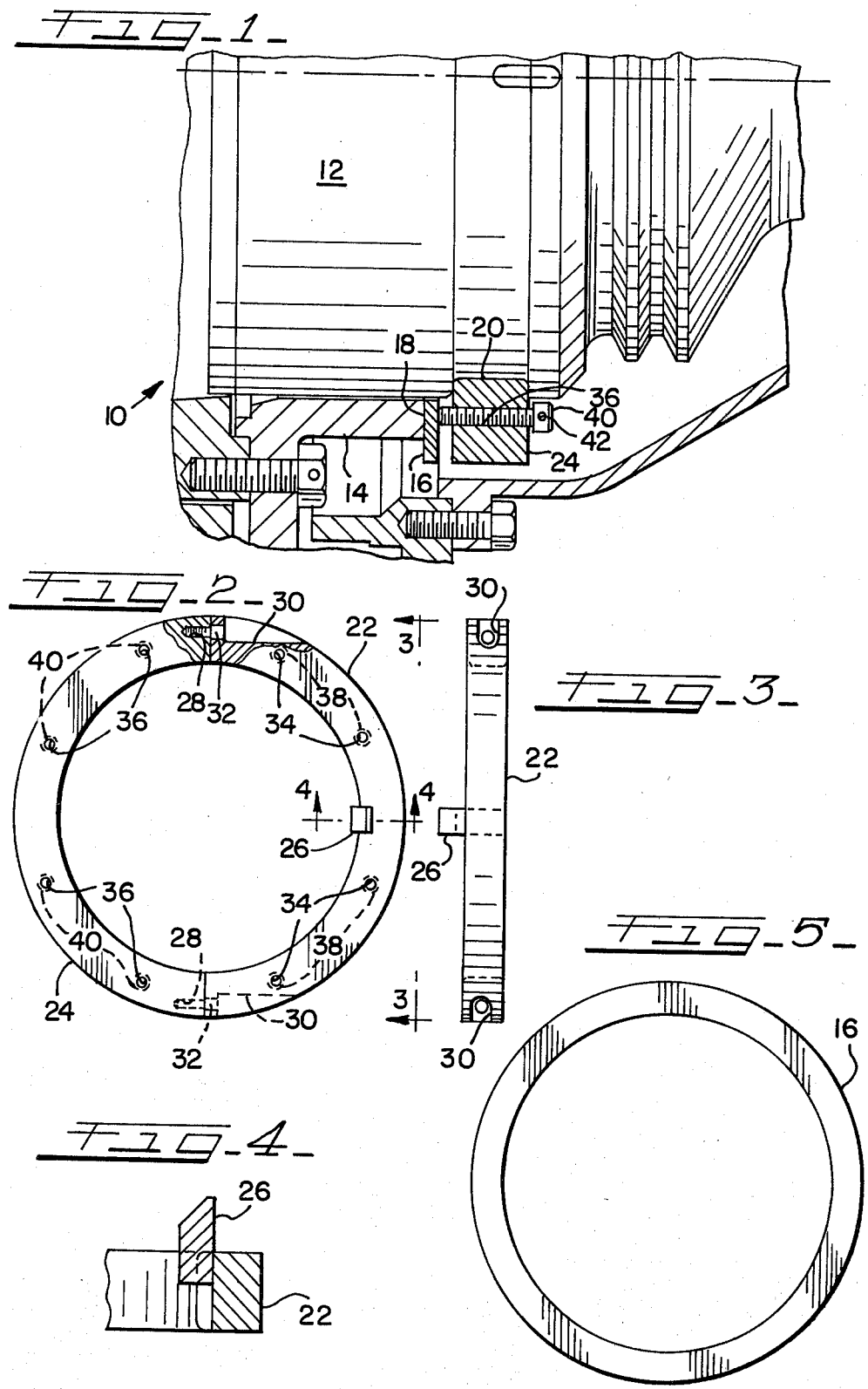

SPLIT COLLAR SPACER RING ASSEMBLY

BACKGROUND AND SUMMARY OF THE INVENTION

The present invention relates to an improved split collar spacer ring assembly. More particularly, this invention relates to such improved assembly useful to hold an elongated shaft, e.g., mill roll and the like, securely in place within a mill chuck sleeve.

Milling operations, particularly on a large scale, are often difficult to perform efficiently. For example, the mill chuck sleeve may require substantially precise alignment within the mill chuck in order to effectively perform its function. In addition, it may be desirable or necessary to change chucks at reasonably frequent intervals. Previous systems for holding such sleeves in mill chucks suffer from certain deficiencies. For example, in one such prior system a threaded split segment was affixed around the shaft and a nut was then run up on the segment pushing the sleeve head and sleeve into position and holding it there. However, the nut had a tendency to jump the segment threads causing them to gall and break off, thereby causing the nut to hang on so that destruction of the nut was required for removal. Changing chucks was time consuming and often involved loss of parts. An improved system for holding a mill chuck sleeve in a mill chuck is clearly desirable.

A brief search for art in this area identified the following U.S. Pat. Nos.: 2,613,571; 3,730,600; 434,484; 449,955; 2,218,179; 2,353,534; 2,431,342; 2,473,307; 4,089,570; 4,094,558; 4,130,286; 4,170,058; 434,477 and 4,203,634.

One object of the present invention is to provide an improved apparatus for holding an elongated shaft within a sleeve.

Another object of the invention is to provide an improved apparatus for holding a mill chuck sleeve within a mill chuck. Other objects and advantages of the present invention will become apparent hereinafter.

An improved assembly adapted to hold an elongated shaft means having a side wall, e.g., comprising a mill chuck sleeve within a space defined by a mill chuck means, having an end wall, e.g., comprising a mill chuck sleeve, has not been discovered. This apparatus, in general, comprises a first collar means adapted to be removably placed in association with a portion of the side wall of the shaft means, and a second collar means adapted to be removably placed in association with a further portion of the side wall of the shaft means. The first and second collar means are capable of being removably joined together to surround and be affixed to the shaft means. A spacer means is provided and is adapted to be placed between the joined first and second collar means and the end wall of the sleeve means so as to be in abutting relation to at least a portion, preferably substantially all of this end wall. Also included is a plurality, preferably two to about six and more preferably four, of both first and second bolt means, e.g., comprising Allen head bolts, adapted to pass through a corresponding plurality of holes in both the first and second collar means, respectively. These first and second bolt means act to contact the spacer means, thereby maintaining the abutting relation between the spacer means and at least a portion of the end wall of the sleeve means. In this manner, the present apparatus acts to hold the shaft means within the sleeve means.

The present apparatus provides substantial benefits and advantages. For example, the present system provides improved ease of assembly, reduced manufacturing costs and maintenance problems, a lower incidence of equipment failures and less down time relative to the prior art, e.g., such as that described previously.

In one preferred embodiment, the shaft means is generally circular in cross section normal to its longitudinal axis and the space defined by the sleeve means (into which a portion of the shaft means is to be placed) is generally circular in configuration. In this embodiment it is referred that each of the first and second collar means be substantially semi-circular in configuration. That is, it is preferred that the first and second collar means each be configured so that each surrounds substantially one-half of the generally circular cross section of the shaft means.

In another preferred embodiment the first and second collar means are removably joined together by a plurality of fastener means, preferably threaded hole Allen head bolt combinations, which are situated (or aligned) in a direction substantially normal to the central axis of the joined first and second collar means.

A further preferred embodiment involves a first collar means which includes a projection and a shaft means which includes a corresponding groove. This projection is capable of being fitted into the groove to aid in placing (and holding) the first collar means in association with the side wall of the shaft means, as desired.

It is preferred that each of the first and second bolt means, e.g., comprising Allen head bolts, be locked in place, i.e., in contact with the spacer means which, in turn, is in abutting relation with at least a portion of the end wall of the sleeve means. Also, the spacer means is preferably constructed of hardened metal to improve its durability.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a side plan view, partially in cross section, of a mill chuck, mill chuck sleeve assembly including an embodiment of the present apparatus.

FIG. 2 is a front plan view, partially in cross section, of the joined, split collar sub-assembly of the embodiment of the present apparatus shown in FIG. 1.

FIG. 3 is an elevational view taken along line 3—3 of FIG. 2.

FIG. 4 is a plan view taken along line 4—4 of FIG. 2.

FIG. 5 is a front plan view of the spacer means of the embodiment of the present apparatus shown in FIG. 1.

DESCRIPTION OF THE PREFERRED EMBODIMENT

Referring now to the drawings, FIG. 1 shows a portion of a roll shop 48-inch temper mill chuck, shown generally at 10. As illustrated in FIG. 1, mill roll neck 12 is in place in the space defined by mill chuck sleeve 14. Mill roll neck 12 and mill chuck sleeve 14 are held in place as follows:

Hardened metal spacer ring 16 abuts the end wall 18 of mill chuck sleeve 14. As shown in FIG. 5, spacer ring 16 has a circular configuration. Similarly, end wall 18 of mill chuck sleeve 14 has a circular configuration so that spacer ring 16 abuts substantially all of end wall 18.

As shown in FIG. 1, mill roll neck 12 has an irregularly shaped configuration along its longitudinal axis. Included in this irregular configuration is a collar area 20 which runs completely around the circular cross section of mill roll neck 12 (normal to the longitudinal axis of mill roll neck 12). Top collar segment 22 and bottom collar segment 24 are placed on collar area 20 as described hereinafter.

Top collar segment 22 and bottom collar segment 24 are independent of each other, but are designed to be joined in place in collar groove 20 as follows. After mill roll neck 12 is positioned in mill chuck sleeve 14, spacer ring 16 is positioned in abutting relation to end wall 18. Top collar segment 22 includes projection 26 which is adapted to be fitted into a roll neck groove located in mill roll neck 12. With mill roll neck 12 and spacer ring 18 in place as described above, top collar segment 22 is placed on mill roll neck 12 so that projection 26 is fitted into the roll neck key way, not shown, thereby temporarily holding top collar segment 22 in place on mill roll neck 12.

With top collar segment 22 so situated, bottom collar segment 24 is placed on the lower half of collar area 20 of mill roll neck 12 so that top and bottom collar segments 22 and 24 may be joined together as shown in FIG. 2. (In FIG. 2, the joined top and bottom collar segments 22 and 24 are shown rotated 90° in the clockwise direction only for illustration purposes). Bottom collar segment 24 includes two substantially opposing threaded holes 28 which are aligned in a direction substantially normal to the center point of the joined top and bottom collar segments 22 and 24. Correspondingly, top collar segment 22 includes two substantially opposing machined cut-outs 30 which are each designed to lead into one of the threaded holes 28 when top and bottom collar segments 22 and 24 are joined together, as shown in FIG. 2. Collar Allen bolts 32 are threaded from each cut-out 30 into each threaded hole 28, thereby joining top and bottom collar segments 22 and 24 together.

Top collar segment 22 includes four top bolt holes 34 and bottom collar segment 24 includes four bottom bolt holes 36. Each of these top and bottom bolt holes 34 and 36 are threaded and adapted to receive a single top or bottom Allen bolt 38 or 40, as the case may be and as shown in FIG. 2. Top and bottom Allen bolts 38 and 40 are threaded through top and bottom bolt holes 34 and 38, respectively, to each make contact with spacer ring 16 which remains in abutting relation to end wall 18 of mill chuck sleeve 14. Each of top and bottom Allen bolts 38 and 40 include a wire hole 42 (as shown in FIG. 1) which is adapted to receive a locking wire to, in effect, lock each of the top and bottom Allen bolts 38 and 40 in place in contact with spacer ring 16. With top and bottom Allen bolts 38 and 40 so situated, mill roll neck 12 is secured in place in mill chuck sleeve 14 and mill chuck 10 is ready for use.

Mill roll neck 12 may easily be replaced e.g., as follows. Each of top and bottom Allen bolts 38 and 40 are unsecured and removed from top and bottom holes 34 and 36, respectively. Next, collar Allen bolts 32 are removed and bottom and top collar segments 24 and 22 are removed from mill roll neck 12. At this point, mill roll neck 12 may be removed from mill chuck sleeve 14 and replaced by another mill roll neck as desired. This new mill roll neck is secured in place in mill chuck sleeve 14 as described above.

As indicated above, the present split collar assembly is easily operated, and is effective to secure mill chucks in place. Further, this assembly is easily maintained and is less prone to disasterous or complete equipment failure or destruction. For example, if one of top or bottom Allen bolts 38 or 40 fails in use, the other bolts provide sufficient strength to allow mill to continue to operate or to be brought safely to a stop for repair. Moreover, repair or replacement of the various components of the present assembly is easily, rapidly and cost effectively accomplished. In short, the present system is clearly an advance over the prior art.

While this invention has been described with respect to various specific examples and embodiments, it is to be understood that the invention is not limited thereto and may be practiced within the scope of the following claims.

what is claimed is:

1. A split collar spacer ring means adapted to hold an elongated shaft means having a longitudinal groove and a circumferential side wall within a space defined by a sleeve means having an end wall, said side wall having an annular collar groove with a bottom end wall substantially parallel to the longitudinal axis of said elongated shaft means which comprises: first collar means removeably placed in a portion of said annular collar groove, said first collar means including first and second ends and a projection placed into said groove; second collar means removably placed in a further portion of said annular collar groove, said second collar means including first and second ends, said first and second collar means being removably joined together so that said first ends and said second ends of said first and second collar means abut each other, respectively, to surround and be affixed to said shaft means; a plurality of fastener means each including an elongated bolt removably secured to said joined first and second collar means and being situated in a direction substantially normal to the central axis of said joined first and second collar means; spacer means between said joined first and second collar means and said end wall abutting at least a portion of said end wall; and a plurality of both first and second bolt means, secured in a corresponding plurality of holes in said first and second collar means, respectively, and contacting said spacer means.

2. The split collar spacer ring means of claim 1 whenever said shaft means is generally circular in cross section normal to its longitudinal axis and said space is substantially cylindrical in configuration.

3. The split collar spacer ring means of claim 1 wherein each of said first and second collar means includes four holes through which said bolt means may be passed.

4. The split collar spacer ring means of claim 2 wherein each of said first and second collar means is substantially semi-circular in configuration.

5. The split collar spacer ring means of claim 1 wherein each of said bolt means comprises an Allen head bolt.

6. The split collar spacer ring means of claim 1 wherein each of said bolt means is capable of being locked in place.

7. The split collar spacer ring means of claim 1 wherein said spacer means is of hardened metal construction.

* * * * *